(12) United States Patent
Tsuda

(10) Patent No.: US 12,397,777 B2
(45) Date of Patent: Aug. 26, 2025

(54) TRAVEL ASSISTANCE METHOD AND TRAVEL ASSISTANCE DEVICE

(71) Applicants: Nissan Motor Co., Ltd., Yokohama (JP); Renault S.A.S., Boulogne-Billancourt (FR)

(72) Inventor: Fumiya Tsuda, Kanagawa (JP)

(73) Assignees: Nissan Motor Co., Ltd., Yokohama (JP); Renault S.A.S., Boulogne-Billancourt (FR)

(*) Notice: Subject to any disclaimer, the term of this patent is extended or adjusted under 35 U.S.C. 154(b) by 0 days.

(21) Appl. No.: 18/854,447

(22) PCT Filed: Apr. 5, 2022

(86) PCT No.: PCT/IB2022/000177
§ 371 (c)(1),
(2) Date: Oct. 4, 2024

(87) PCT Pub. No.: WO2023/194760
PCT Pub. Date: Oct. 12, 2023

(65) Prior Publication Data
US 2025/0171013 A1     May 29, 2025

(51) Int. Cl.
*B60W 30/045* (2012.01)
*B60W 10/04* (2006.01)
(Continued)

(52) U.S. Cl.
CPC .......... *B60W 30/045* (2013.01); *B60W 10/04* (2013.01); *B60W 10/18* (2013.01);
(Continued)

(58) Field of Classification Search
CPC .... B60W 30/045; B60W 10/04; B60W 10/18; B60W 40/103; B60W 40/105;
(Continued)

(56) References Cited

U.S. PATENT DOCUMENTS

| 4,767,588 A * | 8/1988 | Ito .......................... B62D 7/159 701/41 |
| 10,899,225 B2 * | 1/2021 | Kishi ................. B60K 23/0808 |

(Continued)

FOREIGN PATENT DOCUMENTS

| CN | 112752691 A | 5/2021 | |
| DE | 102012013611 A1 * | 8/2013 | .......... B60T 8/17551 |

(Continued)

*Primary Examiner* — Babar Sarwar
(74) *Attorney, Agent, or Firm* — Young Basile Hanlon & MacFarlane, P.C.

(57) ABSTRACT

A travel assistance method sets a target slip angle, estimates or detects an actual slip angle, sets a target braking/driving force by, when a sign of the vehicle body slip angle rotating in a turning direction of the vehicle is defined as positive and a sign of the vehicle body slip angle rotating in an opposite direction to the turning direction is defined as negative, correcting a required braking/driving force in such a manner as to increase a braking/driving force for a rear wheel or reduce a braking/driving force generated on a front wheel when the actual slip angle is larger than the target slip angle and correcting the required braking/driving force in such a manner as to reduce a braking/driving force for the rear wheel or increase a braking/driving force generated on the front wheel when the actual slip angle is smaller than the target slip angle.

10 Claims, 4 Drawing Sheets

(51) Int. Cl.
  *B60W 10/18* (2012.01)
  *B60W 40/103* (2012.01)
  *B60W 40/105* (2012.01)
(52) U.S. Cl.
  CPC ........ *B60W 40/103* (2013.01); *B60W 40/105* (2013.01); *B60W 2520/10* (2013.01); *B60W 2520/125* (2013.01); *B60W 2520/14* (2013.01); *B60W 2520/20* (2013.01); *B60W 2540/10* (2013.01); *B60W 2540/12* (2013.01); *B60W 2540/18* (2013.01); *B60W 2720/14* (2013.01); *B60W 2720/20* (2013.01)
(58) Field of Classification Search
  CPC ....... B60W 2520/10; B60W 2520/125; B60W 2520/14; B60W 2520/20; B60W 2540/10; B60W 2540/12; B60W 2540/18; B60W 2720/14; B60W 2720/20
  See application file for complete search history.

(56) References Cited

U.S. PATENT DOCUMENTS

| | | | |
|---|---|---|---|
| 11,247,561 B2 | 2/2022 | Gully | |
| 12,017,642 B2 | 6/2024 | Luo et al. | |
| 2007/0032937 A1* | 2/2007 | Yamaguchi | B60W 30/045 701/41 |
| 2011/0035129 A1* | 2/2011 | Yasui | B60T 8/17558 701/70 |
| 2011/0218700 A1* | 9/2011 | Mori | B60W 10/06 701/31.4 |
| 2011/0218706 A1* | 9/2011 | Mori | B60W 30/025 701/36 |
| 2018/0118220 A1* | 5/2018 | Kimura | B60W 10/20 |
| 2020/0164744 A1* | 5/2020 | Kishi | B60K 23/0808 |
| 2022/0080838 A1 | 3/2022 | Hwang et al. | |
| 2023/0339456 A1 | 10/2023 | Luo et al. | |

FOREIGN PATENT DOCUMENTS

| | | | | |
|---|---|---|---|---|
| DE | 102013214804 A1 * | 1/2015 | | B60W 30/02 |
| EP | 0914997 A2 * | 5/1999 | | B60T 8/1755 |
| EP | 2578460 A1 * | 4/2013 | | B60T 8/17552 |
| EP | 3315371 A1 * | 5/2018 | | B60T 8/17552 |
| JP | H03-070633 A | 3/1991 | | |
| JP | H10-016738 A | 1/1998 | | |
| JP | H11-240458 A | 9/1999 | | |
| JP | 2003-194209 A | 7/2003 | | |
| JP | 2018-069998 A | 5/2018 | | |
| JP | 2020-083073 A | 6/2020 | | |
| JP | 2020-192938 A | 12/2020 | | |
| JP | 2021-142883 A | 9/2021 | | |
| WO | WO-2006013645 A1 * | 2/2006 | | B60T 8/1755 |
| WO | WO-2019059131 A1 * | 3/2019 | | B60W 40/112 |

* cited by examiner

[FIG.5]
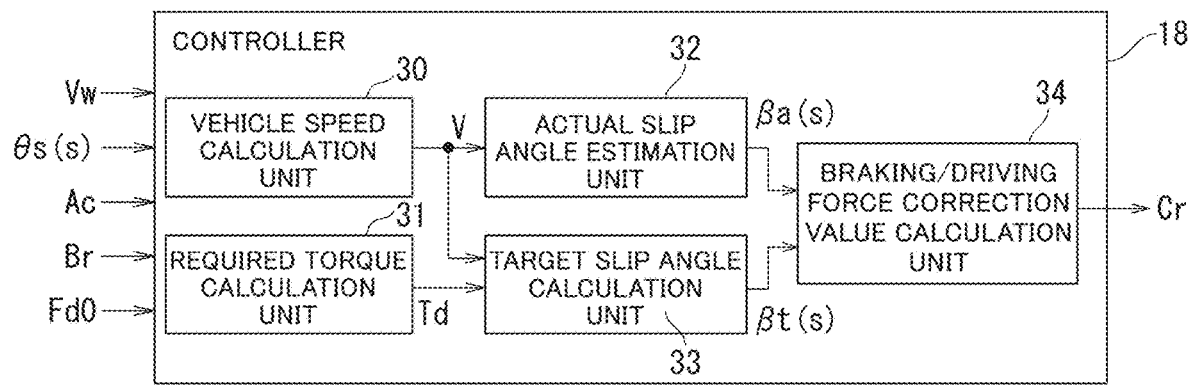
[FIG. 6]
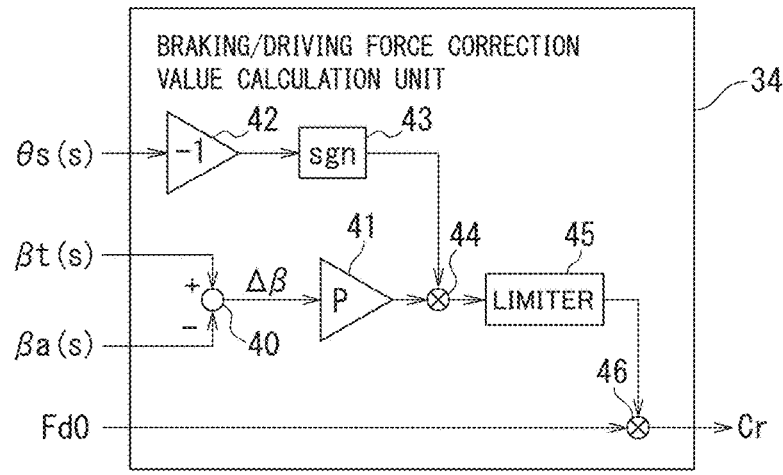

[FIG.7]
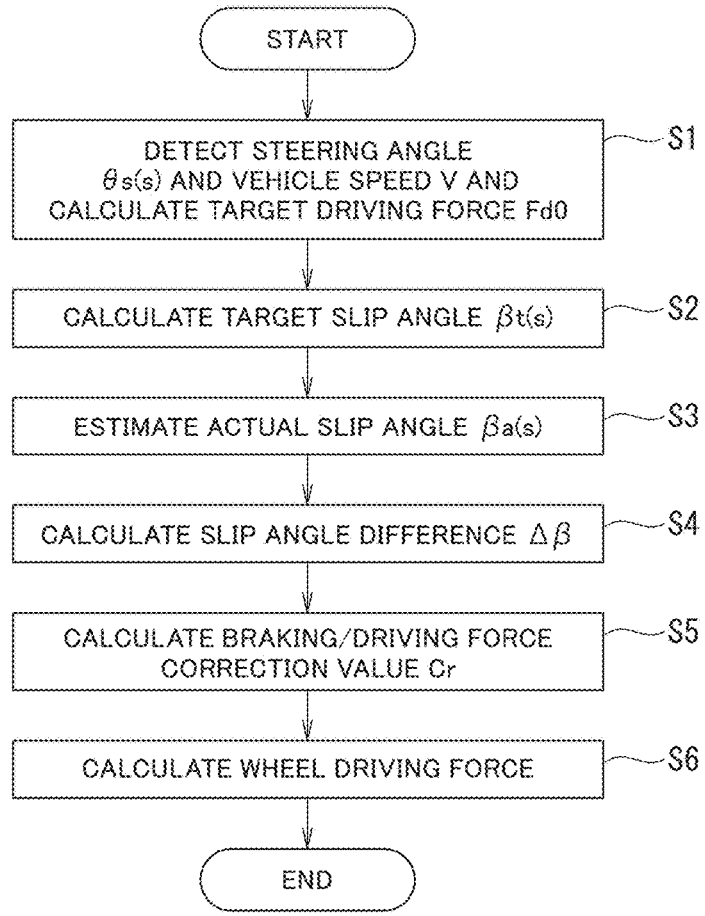
[FIG.8]
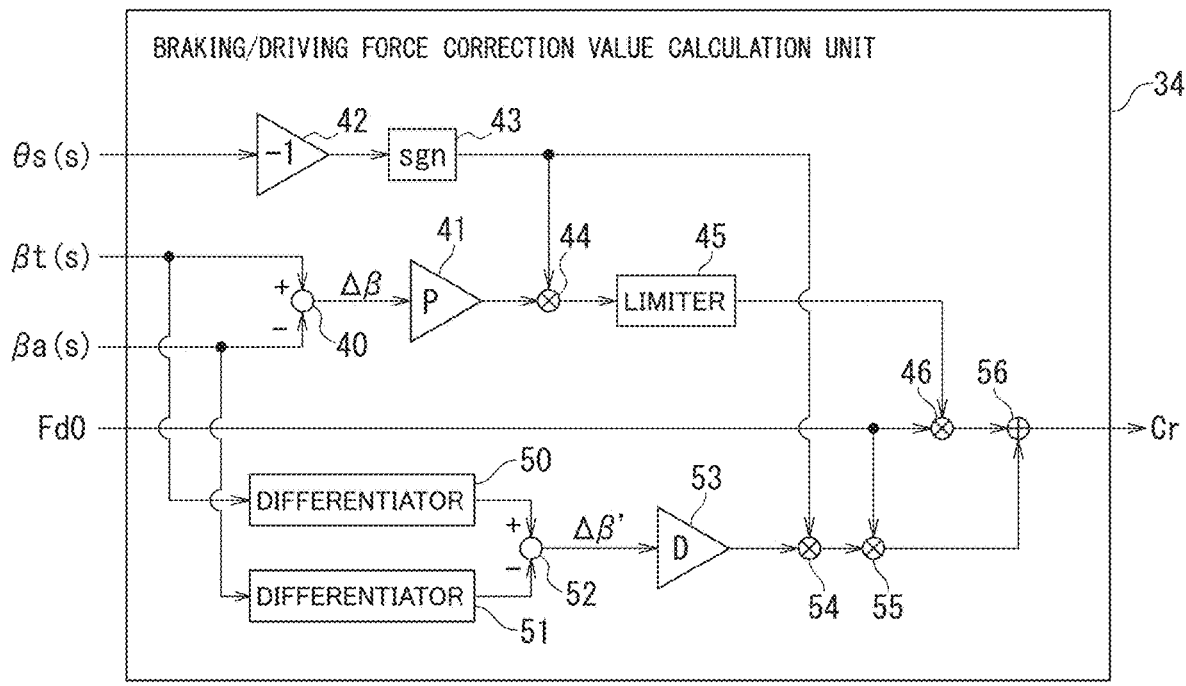

TRAVEL ASSISTANCE METHOD AND TRAVEL ASSISTANCE DEVICE

TECHNICAL FIELD

The present invention relates to a travel assistance method and a travel assistance device.

BACKGROUND

In JP H03-70633 A described below, a torque control device that, in order to increase turning performance, increases a torque distribution to the front wheel side when an actual yaw rate is larger than a target yaw rate and increases a torque distribution to the rear wheel side when the actual yaw rate is smaller than the target yaw rate is described.

SUMMARY

Although a driver can achieve a desired yaw rate by operating a steering wheel, the driver cannot simultaneously achieve a desired yaw rate and a desired vehicle body slip angle. When the vehicle body slip angle becomes excessive or insufficient, the driver is influenced by a difference of a line of sight from a travel direction of a vehicle. Thus, there are some cases where the driver steers the steering wheel more than necessary or the amount of steering is insufficient. As a result, it sometimes becomes difficult to perform steering operation to cause the vehicle to turn along a desired travel line.

An object of the present invention is to facilitate steering operation to cause a vehicle to turn along a desired travel line.

According to an aspect of the present invention, there is provided a travel assistance method including: detecting vehicle speed of a vehicle; detecting a steering angle of a steering wheel; setting a required braking/driving force according to an operation amount of an accelerator pedal or a brake pedal operated by a driver; setting a target value of a vehicle body slip angle, the vehicle body slip angle being an angle from a longitudinal direction of a vehicle body to a travel direction of the vehicle, as a target slip angle, based on the vehicle speed and the steering angle; estimating or detecting an actual slip angle, the actual slip angle being an actual vehicle body slip angle; setting a target braking/driving force by, when a sign of the vehicle body slip angle rotating in a turning direction of the vehicle is defined as positive and a sign of the vehicle body slip angle rotating in an opposite direction to the turning direction is defined as negative, correcting the required braking/driving force in such a manner as to increase a braking/driving force for a rear wheel or reduce a braking/driving force generated on a front wheel when the actual slip angle is larger than the target slip angle and correcting the required braking/driving force in such a manner as to reduce a braking/driving force for the rear wheel or increase a braking/driving force generated on the front wheel when the actual slip angle is smaller than the target slip angle; and generating the target braking/driving force in the vehicle.

According to an aspect of the present invention, it is possible to facilitate steering operation to cause a vehicle to turn along a desired travel line.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 5 is a block diagram of an example of a functional configuration of a controller in FIG. 1;

FIG. 6 is a block diagram of an example of a functional configuration of a braking/driving force correction value calculation unit;

FIG. 7 is a flowchart of an example of a travel assistance method of the embodiment; and FIG. 8 is a block diagram of a variation of the functional configuration of the braking/driving force correction value calculation unit.

DETAILED DESCRIPTION (Configuration)

Figure 1:
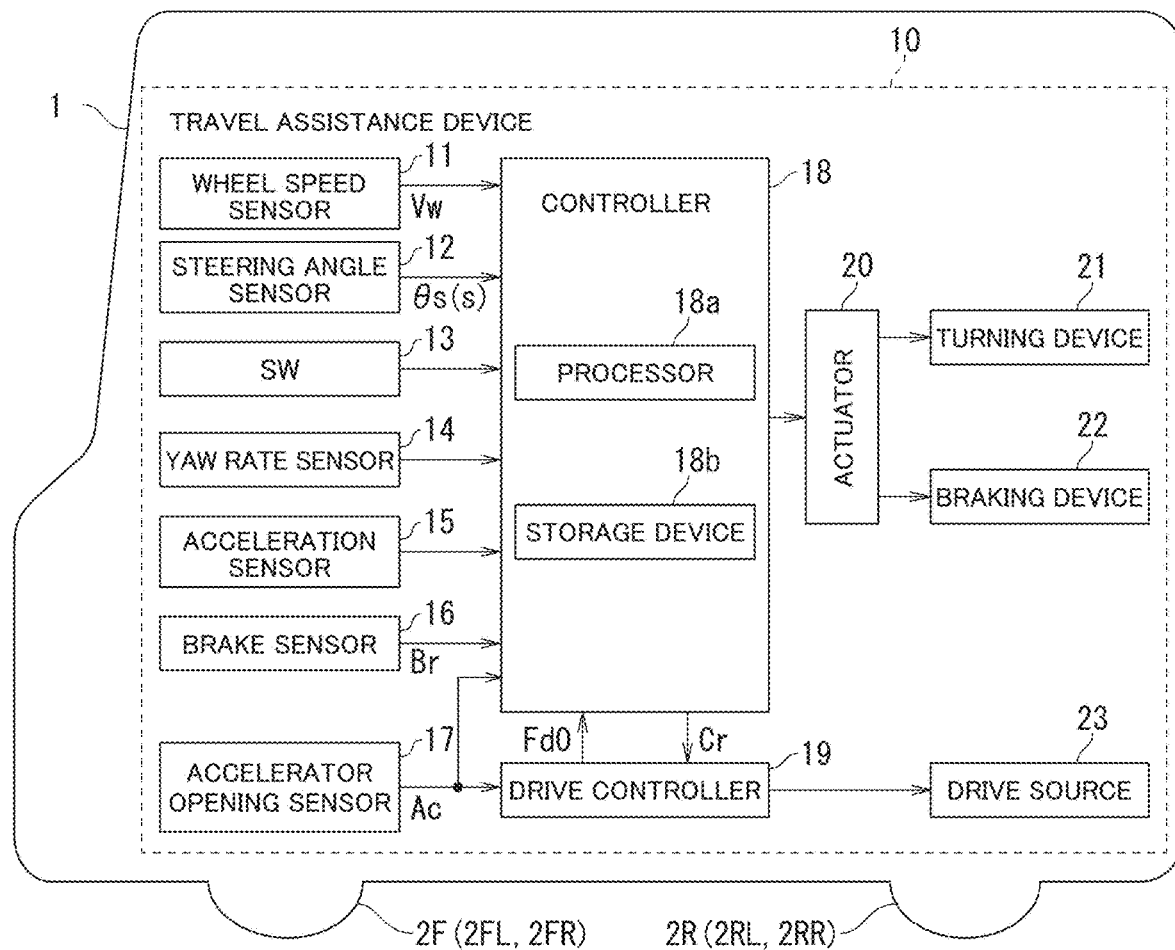
FIG. 1 is a schematic configuration diagram of an example of a travel assistance device of an embodiment.

FIG. 1 is a schematic configuration diagram of an example of a travel assistance device of an embodiment. A travel assistance device 10 adjusts a vehicle body slip angle of a vehicle 1 by controlling a braking/driving force for at least one of front wheels 2F (a front left wheel 2FL and a front right wheel 2FR) and rear wheels 2R (a rear left wheel 2RL and a rear right wheel 2RR) of the vehicle 1 and assists steering operation of the vehicle 1 performed by a driver.

The travel assistance device 10 includes a wheel speed sensor 11, a steering angle sensor 12, a switch (SW) 13, a yaw rate sensor 14, an acceleration sensor 15, a brake sensor 16, an accelerator opening sensor 17, a controller 18, a drive controller 19, actuators 20, a turning device 21, a braking device 22, and a drive source 23.

The wheel speed sensor 11 detects wheel speed Vw of the vehicle 1. For example, the wheel speed sensor 11 may detect an average value of wheel speeds of the front left wheel 2FL, the front right wheel 2FR, the rear left wheel 2RL, and the rear right wheel 2RR as the wheel speed Vw.

The steering angle sensor 12 detects a steering angle θs(s) of a steering wheel. Herein, a sign of a steering angle θs(s) rotating leftward (counterclockwise) is defined as positive (plus), and a sign of a steering angle θs(s) rotating rightward (clockwise) is defined as negative (minus).

The switch (SW) 13 is an operation element for accepting a selection input that a passenger (for example, the driver) of the vehicle 1 inputs to select a response characteristic of the vehicle 1 responding to driving operation performed by the driver.

For example, the switch 13 may be a switch to switch driving modes that represent driving characteristics of the vehicle 1. For example, the driving modes may include a first mode (for example, a sport mode) in which the response characteristic of the vehicle 1 responding to the driving operation performed by the driver is high and a second mode (for example, an economy mode) in which the response characteristic of the vehicle 1 responding to the driving operation is gentle. The response characteristic of the vehicle 1 responding to the driving operation may be, for example, a response characteristic of a steered angle of steered wheels with respect to operation of the steering wheel, a drive characteristic with respect to operation of an accelerator pedal, or a braking characteristic with respect to a brake pedal. The controller 18 changes the response characteristic of the vehicle 1 responding to the driving operation performed by the driver, based on a setting state of the switch 13.

The yaw rate sensor 14 detects a yaw rate of the vehicle 1.

The acceleration sensor 15 detects lateral acceleration that is acceleration in the vehicle width direction of the vehicle 1.

The brake sensor 16 detects a brake operation amount Br that is an operation amount of the brake pedal operated by the driver.

The accelerator opening sensor 17 detects an accelerator operation amount Ac that is an operation amount of the accelerator pedal operated by the driver.

The controller 18 is an electronic control unit (ECU) that performs travel assistance control of the vehicle 1. The controller 18 includes a processor 18*a* and peripheral components, such as a storage device 18*b*. The processor 18*a* may be, for example, a central processing unit (CPU) or a micro-processing unit (MPU). The storage device 18*b* may include a semiconductor storage device, a magnetic storage device, an optical storage device, or the like. The storage device 18*b* may include registers, a cache memory, and a memory, such as a read only memory (ROM) and a random access memory (RAM), that is used as a main storage device. Functions of the controller 18, which will be described below, are achieved by, for example, the processor 18*a* executing computer programs stored in the storage device 18*b*.

Note that the controller 18 may be formed using dedicated hardware for performing various types of information processing that will be described below. For example, the controller 18 may include a functional logic circuit that is implemented in a general-purpose semiconductor integrated circuit. For example, the controller 18 may include a programmable logic device (PLD), such as a field-programmable gate array (FPGA), and the like.

The drive controller 19 is an electronic control unit that controls a driving force that the drive source 23 generates on at least one of the front wheels 2F and the rear wheels 2R, based on the accelerator operation amount Ac detected by the accelerator opening sensor 17 and a braking/driving force correction value Cr set by the controller 18. Specifically, the drive controller 19 calculates a pre-correction target driving force Fd0, based on the accelerator operation amount Ac. The drive controller 19 causes the drive source 23 to generate a target driving force Fd that is obtained by correcting the pre-correction target driving force Fd0 with the braking/driving force correction value Cr set by the controller 18.

The drive controller 19 includes a processor and peripheral components, such as a storage device. The processor may be, for example, a CPU or an MPU. The storage device may include a semiconductor storage device, a magnetic storage device, an optical storage device, or the like. The storage device may include registers, a cache memory, and a memory, such as a ROM and a RAM, that is used as a main storage device. Functions of the drive controller 19, which will be described below, are achieved by, for example, the processor executing computer programs stored in the storage device. The drive controller 19 may be formed using dedicated hardware for performing various types of information processing that will be described below. For example, the drive controller 19 may include a functional logic circuit that is implemented in a general-purpose semiconductor integrated circuit. For example, the drive controller 19 may include a PLD, such as an FPGA, or the like.

The drive controller 19 may be a separate controller from the controller 18 or the drive controller 19 and the controller 18 may be an integrated controller.

The actuators 20 cause the turning device 21 and the braking device 22 to operate in accordance with control signals from the controller 18 and generate a vehicle behavior of the vehicle 1. The actuators 20 include a steering actuator and a brake control actuator. The steering actuator causes the turning device 21 to operate and controls a steering direction and the amount of steering of the vehicle 1. The brake control actuator causes the braking device 22 to operate and generate a friction braking force and thereby controls front-rear deceleration of the vehicle 1.

Next, travel assistance control performed by the travel assistance device 10 of the embodiment will be described. Although as described above, the driver can achieve a desired yaw rate by operating the steering wheel, the driver cannot achieve a desired yaw rate and a desired vehicle body slip angle at the same time.

FIGS. 2A to 2D are now referred to. Herein, the "vehicle body slip angle" is defined by an angle β from a vehicle body longitudinal direction db of the vehicle 1 to a travel direction dd of the vehicle 1. In FIGS. 2A to 2D, a reference sign P denotes a position of the center of gravity of the vehicle 1, and a reference sign Ld denotes a travel line (travel trajectory) of the vehicle 1 that is turning.

Herein, a sign of the vehicle body slip angle β rotating leftward (counterclockwise) is defined as positive (plus), and the sign of the vehicle body slip angle β rotating rightward (clockwise) is defined as negative (minus).

Figure 2A:
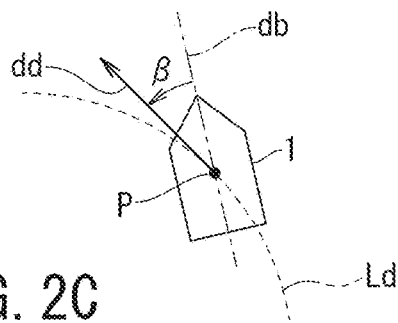
FIGS. 2A to 2D are explanatory diagrams of a vehicle body slip angle.
Figure 2C:
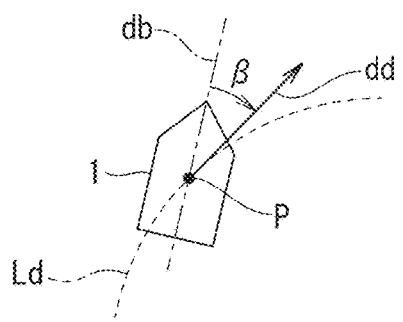
Figure 2B:
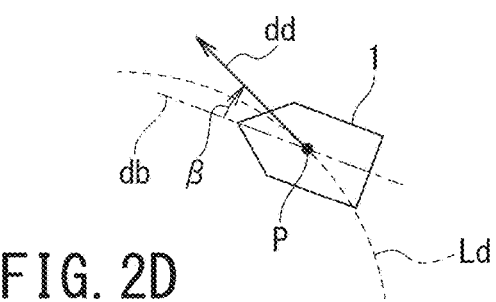

As illustrated in FIG. 2A, when the vehicle body longitudinal direction db while the vehicle 1 is turning to the left is directed to an outer side of the turning of the travel direction dd, the sign of the vehicle body slip angle β is positive, and as illustrated in FIG. 2B, when the vehicle body longitudinal direction db while the vehicle 1 is turning to the left is directed to an inner side of the turning of the travel direction dd, the sign of the vehicle body slip angle β is negative.

Figure 2D:
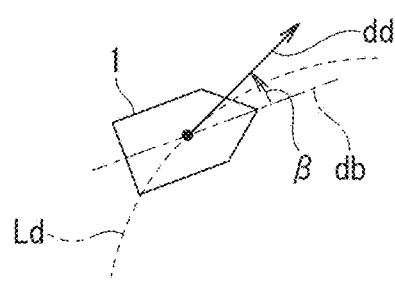

As illustrated in FIG. 2C, when the vehicle body longitudinal direction db while the vehicle 1 is turning to the right is directed to the outer side of the turning of the travel direction dd, the sign of the vehicle body slip angle β is negative, and as illustrated in FIG. 2D, when the vehicle body longitudinal direction db while the vehicle 1 is turning to the right is directed to an inner side of the turning of the travel direction dd, the sign of the vehicle body slip angle β is positive.

In the following description, a state in which the vehicle body longitudinal direction db while the vehicle 1 is turning is directed to the outer side of the turning of the travel direction dd as illustrated in FIGS. 2A and 2C is referred to as "outwardly-directed state", and a state in which the vehicle body longitudinal direction db while the vehicle 1 is turning is directed to an inner side of the turning of the travel direction dd as illustrated in FIGS. 2B and 2D is referred to as "inwardly-directed state".

In general, when vehicle speed is comparatively low, the vehicle 1 tends to be brought into the outwardly-directed state, and when the vehicle speed is comparatively high, the vehicle 1 tends to be brought into the inwardly-directed state. When the vehicle 1 is in the outwardly-directed state, the driver tends to attempt to increase the amount of steering more than necessary due to a difference of a line of sight of the driver from the travel direction dd of the vehicle 1, and conversely, when the vehicle 1 is in the inwardly-directed state, the driver tends to attempt to reduce the amount of steering. Thus, when the vehicle body slip angle is excessive or insufficient, it sometimes becomes difficult to perform steering operation to cause a vehicle to turn along a desired travel line.

Therefore, the travel assistance device 10 of the embodiment sets a target slip angle $\beta t(s)$ that is a target value of the vehicle body slip angle, based on vehicle speed V and the steering angle $\theta s(s)$. The target slip angle $\beta t(s)$ is an angle from a target value of the vehicle body longitudinal direction db (hereinafter, sometimes referred to as "target vehicle body longitudinal direction dbt") to the travel direction dd of the vehicle 1. The travel assistance device 10 controls a braking/driving force for at least one of the front wheels 2F and the rear wheels 2R in such a way that an actual slip angle $\beta a(s)$ that is an actual vehicle body slip angle comes close to the target slip angle $\beta t(s)$.

FIGS. 3A to 3D are schematic diagrams illustrative of examples of the target slip angle $\beta t(s)$ and the actual slip angle $\beta a(s)$ when the vehicle 1 turns to the left.

Figure 3A:
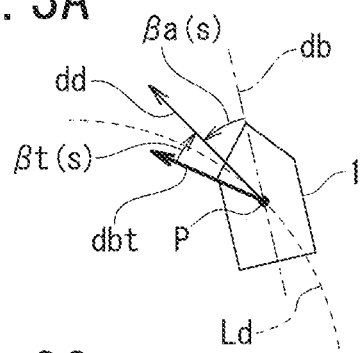
FIGS. 3A to 3D are schematic diagrams illustrative of examples of a target slip angle and an actual slip angle when a vehicle turns to the left.

In the example in FIG. 3A, while the vehicle body longitudinal direction db is directed to the outer side of the turning of the travel direction dd ($\beta a(s)>0$), the target vehicle body longitudinal direction dbt is directed to the inner side of the turning of the travel direction dd ($\beta t(s)<0$). That is, the actual slip angle $\beta a(s)$ is larger than the target slip angle $\beta t(s)$. In this case, the travel assistance device 10 controls a braking/driving force for at least one of the front wheels 2F and the rear wheels 2R in such a way that the actual slip angle $\beta a(s)$ decreases (that is, in such a way that the vehicle body longitudinal direction db rotates toward the inner side of the turning). For example, the travel assistance device 10 reduces a braking/driving force for the front wheels 2F or increases a braking/driving force for the rear wheels 2R. The travel assistance device 10 may reduce the braking/driving force for the front wheels 2F and increase the braking/driving force for the rear wheels 2R.

Figure 3B:
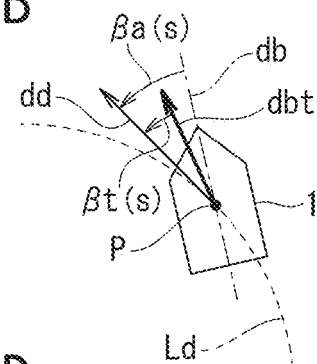

In the example in FIG. 3B, although both the vehicle body longitudinal direction db and the target vehicle body longitudinal direction dbt are directed to the outer side of the turning of the travel direction dd, the vehicle body longitudinal direction db is directed to the outer side of the turning of the target vehicle body longitudinal direction dbt. That is, the actual slip angle $\beta a(s)$ is larger than the target slip angle $\beta t(s)$ ($\beta a(s)>\beta t(s)>0$). In this case, the travel assistance device 10 also controls a braking/driving force for at least one of the front wheels 2F and the rear wheels 2R in such a way that the actual slip angle $\beta a(s)$ decreases.

Figure 3C:
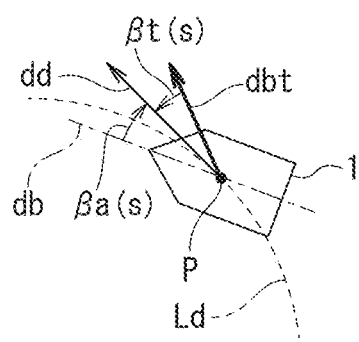

In the example in FIG. 3C, while the vehicle body longitudinal direction db is directed to the inner side of the turning of the travel direction dd ($\beta a(s)<0$), the target vehicle body longitudinal direction dbt is directed to the outer side of the turning of the travel direction dd ($\beta t(s)>0$). That is, the actual slip angle $\beta a(s)$ is smaller than the target slip angle $\beta t(s)$. In this case, the travel assistance device 10 controls a braking/driving force for at least one of the front wheels 2F and the rear wheels 2R in such a way that the actual slip angle $\beta a(s)$ increases (that is, in such a way that the vehicle body longitudinal direction db rotates toward the outer side of the turning). For example, the travel assistance device 10 increases a braking/driving force for the front wheels 2F or reduces a braking/driving force for the rear wheels 2R. The travel assistance device 10 may increase the braking/driving force for the front wheels 2F and reduces the braking/driving force for the rear wheels 2R.

Figure 3D:
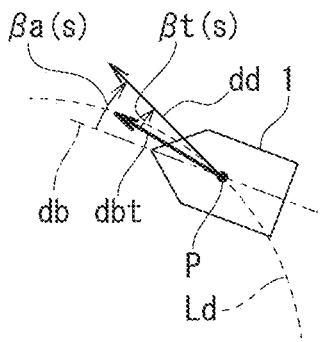

In the example in FIG. 3D, although both the vehicle body longitudinal direction db and the target vehicle body longitudinal direction dbt are directed to the inner side of the turning of the travel direction dd, the vehicle body longitudinal direction db is directed to the inner side of the turning of the target vehicle body longitudinal direction dbt. That is, the actual slip angle $\beta a(s)$ is smaller than the target slip angle $\beta t(s)$ ($\beta a(s)<\beta t(s)<0$). In this case, the travel assistance device 10 also controls a braking/driving force for at least one of the front wheels 2F and the rear wheels 2R in such a way that the actual slip angle $\beta a(s)$ increases.

FIGS. 4A to 4D are schematic diagrams illustrative of examples of the target slip angle $\beta t(s)$ and the actual slip angle $\beta a(s)$ when the vehicle 1 turns to the right.

Figure 4A:
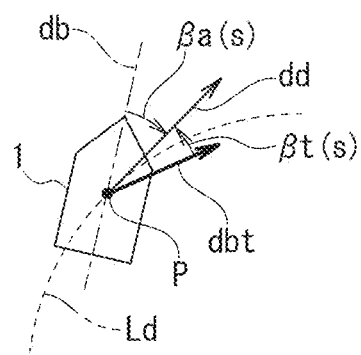
FIGS. 4A to 4D are schematic diagrams illustrative of examples of the target slip angle and the actual slip angle when the vehicle turns to the right.

In the example in FIG. 4A, while the vehicle body longitudinal direction db is directed to the outer side of the turning of the travel direction dd ($\beta a(s)<0$), the target vehicle body longitudinal direction dbt is directed to the inner side of the turning of the travel direction dd ($\beta t(s)>0$). That is, the actual slip angle $\beta a(s)$ is smaller than the target slip angle $\beta t(s)$. In this case, the travel assistance device 10 controls a braking/driving force for at least one of the front wheels 2F and the rear wheels 2R in such a way that the actual slip angle $\beta a(s)$ increases (that is, in such a way that the vehicle body longitudinal direction db rotates toward the inner side of the turning). For example, the travel assistance device 10 reduces a braking/driving force for the front wheels 2F or increases a braking/driving force for the rear wheels 2R. The travel assistance device 10 may reduce the braking/driving force for the front wheels 2F and increase the braking/driving force for the rear wheels 2R.

Figure 4B:
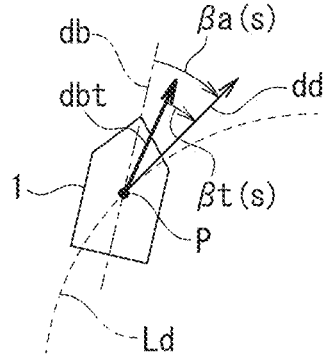

In the example in FIG. 4B, although both the vehicle body longitudinal direction db and the target vehicle body longitudinal direction dbt are directed to the outer side of the turning of the travel direction dd, the vehicle body longitudinal direction db is directed to the outer side of the turning of the target vehicle body longitudinal direction dbt. That is, the actual slip angle $\beta a(s)$ is smaller than the target slip angle $\beta t(s)$ ($\beta a(s)<\beta t(s)<0$). In this case, the travel assistance device 10 also controls a braking/driving force for at least one of the front wheels 2F and the rear wheels 2R in such a way that the actual slip angle $\beta a(s)$ increases.

Figure 4C:
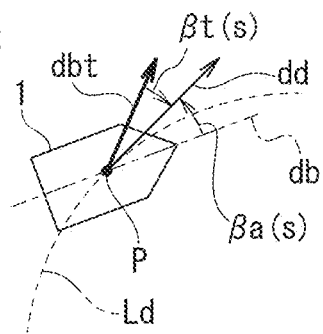

In the example in FIG. 4C, while the vehicle body longitudinal direction db is directed to the inner side of the turning of the travel direction dd ($\beta a(s)>0$), the target vehicle body longitudinal direction dbt is directed to the outer side of the turning of the travel direction dd ($\beta t(s)<0$). That is, the actual slip angle $\beta a(s)$ is larger than the target slip angle $\beta t(s)$. In this case, the travel assistance device 10 controls a braking/driving force for at least one of the front wheels 2F and the rear wheels 2R in such a way that the actual slip angle $\beta a(s)$ decreases (that is, in such a way that the vehicle body longitudinal direction db rotates toward the outer side of the turning). For example, the travel assistance device 10 increases a braking/driving force for the front wheels 2F or reduces a braking/driving force for the rear wheels 2R. The travel assistance device 10 may increase the braking/driving force for the front wheels 2F and reduces the braking/driving force for the rear wheels 2R.

Figure 4D:
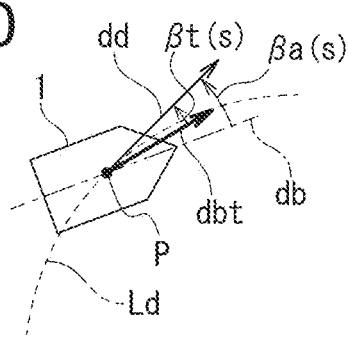

In the example in FIG. 4D, although both the vehicle body longitudinal direction db and the target vehicle body longitudinal direction dbt are directed to the inner side of the turning of the travel direction dd, the vehicle body longitudinal direction db is directed to the inner side of the turning of the target vehicle body longitudinal direction dbt. That is, the actual slip angle βa(s) is larger than the target slip angle βt(s) (βa(s)>βt(s)>0). In this case, the travel assistance device 10 also controls a braking/driving force for at least one of the front wheels 2F and the rear wheels 2R in such a way that the actual slip angle βa(s) decreases.

Since because of this configuration, the vehicle body slip angle β (the actual slip angle βa(s)) of the vehicle 1 can be appropriately controlled, the vehicle body slip angle β can be prevented from becoming excessive or insufficient. As a result, steering operation to cause a vehicle to turn along a desired travel line is facilitated.

It should be noted that while in the example of the left turn in FIGS. 3A to 3D, the sign of the vehicle body slip angle β rotating in a turning direction of the vehicle 1 is defined as positive, in the example of right turn in FIGS. 4A to 4D, the sign of the vehicle body slip angle β rotating in the turning direction of the vehicle 1 is defined as negative.

Therefore, in the case of the right turn, when it is also defined that the sign of the vehicle body slip angle β rotating in the turning direction of the vehicle 1 is positive and the sign of the vehicle body slip angle β rotating in an opposite direction to the turning direction is negative, the travel assistance device 10 reduces a braking/driving force for the front wheels 2F or increases a braking/driving force for the rear wheels 2R when the actual slip angle βa(s) is larger than the target slip angle βt(s) (that is, as illustrated in FIGS. 3A, 3B, 4A, and 4B, the vehicle body longitudinal direction db is directed to the outer side of the turning of the target vehicle body longitudinal direction dbt). Alternatively, the travel assistance device 10 reduces a braking/driving force for the front wheels 2F and increases a braking/driving force for the rear wheels 2R. On the other hand, when the actual slip angle βa(s) is smaller than the target slip angle βt(s) (that is, as illustrated in FIGS. 3C, 3D, 4C, and 4D, the vehicle body longitudinal direction db is directed to the inner side of the turning of the target vehicle body longitudinal direction dbt), the travel assistance device 10 increases a braking/driving force for the front wheels 2F or reduces a braking/driving force for the rear wheels 2R. Alternatively, the travel assistance device 10 increases a braking/driving force for the front wheels 2F and reduces a braking/driving force for the rear wheels 2R.

FIG. 5 is a block diagram of an example of a functional configuration of the controller 18. The controller 18 includes a vehicle speed calculation unit 30, a required torque calculation unit 31, an actual slip angle estimation unit 32, a target slip angle calculation unit 33, and a braking/driving force correction value calculation unit 34.

The wheel speed Vw detected by the wheel speed sensor 11, the steering angle θs(s) detected by the steering angle sensor 12, the brake operation amount Br detected by the brake sensor 16, the accelerator operation amount Ac detected by the accelerator opening sensor 17, and the pre-correction target driving force Fd0 calculated by the drive controller 19 are input to the controller 18.

The vehicle speed calculation unit 30 calculates vehicle speed V of the vehicle 1, based on the wheel speed Vw and inputs information about the vehicle speed V to the actual slip angle estimation unit 32 and the target slip angle calculation unit 33. The required torque calculation unit 31 calculates required braking/driving torque Td matching the brake operation amount Br or the accelerator operation amount Ac by the driver and inputs information about the required braking/driving torque Td to the target slip angle calculation unit 33.

The actual slip angle estimation unit 32 estimates an actual slip angle βa(s), based on at least the vehicle speed V and the steering angle θs(s). For example, the actual slip angle estimation unit 32 may estimate the actual slip angle βa(s), based on the equation (1) below.

[Math 1]

$$\beta a(s) = G_\beta^{\delta_f} \frac{1 + T_\beta^{\delta_f} s}{1 + \frac{2\zeta s}{\omega_n} + \frac{s^2}{\omega_n^2}} \theta s(s) \quad (1)$$

[Math 2]

$$\omega_n = \frac{2l}{V}\sqrt{\frac{K_f K_r}{mI}}\sqrt{1 + AV^2}$$

[Math 3]

$$\zeta = \frac{m(l_f^2 K_f + l_r^2 K_r) + I(K_f + K_r)}{2l\sqrt{mIK_f K_r(1 + AV^2)}}$$

[Math 4]

$$G_\beta^{\delta_f} = \frac{1 - \frac{ml_f}{2ll_r K_r}V^2}{1 + AV^2} \frac{l_r}{l}$$

[Math 5]

$$T_\beta^{\delta_f} = \frac{IV}{2ll_r K_r} \frac{1}{1 - \frac{ml_f}{2ll_r K_r}V^2}$$

[Math 6]

$$A = -\frac{m}{2l^2} \frac{l_f K_f - l_r K_r}{K_f K_r}$$

In the above-described equation, m is weight of a vehicle, I is a yaw inertia radius, l is a wheelbase, $l_f$ is distance from a center P of gravity of the vehicle 1 to an axle of the front wheels, $l_r$ is distance from the center P of gravity to an axle of the rear wheels, $K_f$ is equivalent cornering power of the front wheels, and $K_r$ is equivalent cornering power of the rear wheels.

The target slip angle calculation unit 33 estimates a target slip angle βt(s), based on at least the vehicle speed V and the steering angle θs(s). For example, the target slip angle calculation unit 33 may estimate the target slip angle βt(s), based on the equation (2) below.

[Math 7]

$$\beta t(s) = K1 \times G_\beta^{\delta_f} \frac{1 + T_\beta^{\delta_f} s}{1 + \frac{2\zeta s}{\omega_n} + \frac{s^2}{\omega_n^2}} \theta s(s) \quad (2)$$

K1 in the equation (2) is slip angle gain, and by appropriately adjusting an absolute value and a sign of the slip angle gain K1, to what extent the target slip angle βt(s) is to be made larger or smaller than the actual slip angle βa(s) can be set. That is, to what extent the target vehicle body longitudinal direction dbt is to be inclined to the inner side of the turning or the outer side of the turning with respect to the vehicle body longitudinal direction db can be set.

For example, when the vehicle speed V is comparatively low, the vehicle 1 tends to be brought into the outwardly-directed state, and when the vehicle speed V is comparatively high, the vehicle 1 tends to be brought into the inwardly-directed state. Thus, the target slip angle calculation unit 33 may set the target slip angle βt(s) according to the vehicle speed V.

Specifically, when the sign of the vehicle body slip angle β rotating in the turning direction of the vehicle 1 is defined as positive and the sign of the vehicle body slip angle β rotating in the opposite direction to the turning direction is defined as negative, a larger target slip angle βt(s) may, for example, be set in a case when the vehicle speed V is high in which the vehicle 1 tends to be the inwardly-directed state than in a case when the vehicle speed V is low in which the vehicle 1 tends to be the outwardly-directed state. For example, the target slip angle may be set in such a manner that the higher the vehicle speed V is, the larger the target slip angle is. Because of this configuration, the vehicle 1 can be prevented from being brought into the inwardly-directed state when the vehicle speed V is high. In addition, by preventing the vehicle 1 from being brought into the outwardly-directed state when the vehicle speed V is low, bringing the vehicle 1 into the inwardly-directed state is facilitated.

The braking/driving force correction value calculation unit 34 calculates a braking/driving force correction value Cr by which a required braking/driving force matching the brake operation amount Br or the accelerator operation amount Ac by the driver is corrected, according to the actual slip angle βa(s) and the target slip angle βt(s).

FIG. 6 is a block diagram of an example of a functional configuration of the braking/driving force correction value calculation unit 34. In FIG. 6, a configuration to calculate a braking/driving force correction value Cr by which a driving force for the rear wheels 2R is corrected, according to the actual slip angle βa(s) and the target slip angle βt(s) is illustrated.

The braking/driving force correction value calculation unit 34 includes a subtracter 40, a gain multiplication unit 41, a sign inversion unit 42, a sign calculation unit 43, a multipliers 44 and 46, and a limiter 45.

The subtracter 40 subtracts the actual slip angle βa(s) from the target slip angle βt(s) and thereby calculates a slip angle difference Δβ=βt(s)−βa(s). The gain multiplication unit 41 outputs a product P×Δβ obtained by multiplying the slip angle difference Δβ by a proportional gain P to the multiplier 44.

The sign inversion unit 42 inverts a sign of the steering angle θs(s), and the sign calculation unit 43 outputs a value "1" when a sign of a steering angle after the sign of the steering angle θs(s) is inverted (−1×θs(s)) is positive and outputs "−1" when the sign is negative. The multiplier 44 normalizes the sign of the slip angle difference Δβ by multiplying the slip angle difference Δβ by the output from the sign calculation unit 43.

Because of this configuration, in whichever case of the left turn or the right turn, the sign of the slip angle difference Δβ is set positive when the vehicle body longitudinal direction db is directed to the outer side of the turning of the target vehicle body longitudinal direction dbt. Because of this configuration, the sign of the braking/driving force correction value Cr is set positive. In addition, when the vehicle body longitudinal direction db is directed to the inner side of the turning of the target vehicle body longitudinal direction dbt, the sign of the slip angle difference Δβ is set negative. Because of this configuration, the sign of the braking/driving force correction value Cr is set negative.

The limiter 45 limits an upper limit and a lower limit of output of the multiplier 44 (that is, the slip angle difference Δβ the sign of which is normalized), and the multiplier 46 calculates a braking/driving force correction value Cr by multiplying the pre-correction target driving force Fd0 by the limited slip angle difference Δβ.

The drive controller 19 in FIG. 1 calculates a target driving force Fd by adding the braking/driving force correction value Cr to the pre-correction target driving force Fd0 and controls the drive source 23 in such a way that a driving force generated on the rear wheels 2R coincides with the target driving force Fd.

Thus, when the vehicle body longitudinal direction db is directed to the outer side of the turning of the target vehicle body longitudinal direction dbt, the vehicle body slip angle β is controlled in such a manner that a driving force for the rear wheels 2R increases and the vehicle body longitudinal direction db rotates in a direction toward the inner side of the turning. Conversely, when the vehicle body longitudinal direction db is directed to the inner side of the turning of the target vehicle body longitudinal direction dbt, the vehicle body slip angle β is controlled in such a manner that a driving force for the rear wheels 2R decreases and the vehicle body longitudinal direction db rotates in a direction toward the outer side of the turning.

Although the example of the braking/driving force correction value calculation unit 34 in FIG. 6 calculates a braking/driving force correction value Cr by which a driving force for the rear wheels 2R is corrected, the braking/driving force correction value calculation unit 34 may calculate a braking/driving force correction value Cr by which a driving force for the front wheels 2F is corrected. In this case, the braking/driving force correction value calculation unit 34 normalizes the sign of the slip angle difference Δβ in a reverse manner to the case in FIG. 6. Because of this configuration, when the vehicle body longitudinal direction db is directed to the outer side of the turning of the target vehicle body longitudinal direction dbt, the sign of the braking/driving force correction value Cr is set negative, and when the vehicle body longitudinal direction db is directed to the inner side of the turning of the target vehicle body longitudinal direction dbt, the sign of the braking/driving force correction value Cr is set positive.

The drive controller 19 in FIG. 1 calculates a target driving force Fd by adding the braking/driving force correction value Cr to the pre-correction target driving force Fd0 and controls the drive source 23 in such a way that a driving force generated on the front wheels 2F coincides with the target driving force Fd.

Thus, when the vehicle body longitudinal direction db is directed to the outer side of the turning of the target vehicle body longitudinal direction dbt, the vehicle body slip angle β is controlled in such a manner that a driving force for the front wheels 2F decreases and the vehicle body longitudinal direction db rotates in a direction toward the inner side of the turning. Conversely, when the vehicle body longitudinal direction db is directed to the inner side of the turning of the target vehicle body longitudinal direction dbt, the vehicle body slip angle β is controlled in such a manner that a driving force for the front wheels 2F increases and the vehicle body longitudinal direction db rotates in a direction toward the outer side of the turning.

Further, the braking/driving force correction value calculation unit 34 may calculate, as braking/driving force correction values Cr, a braking/driving force correction value CrF by which a driving force for the front wheels 2F is corrected and a braking/driving force correction value CrR by which a driving force for the rear wheels 2R is corrected, at the same time. In this case, when the vehicle body longitudinal direction db is directed to the outer side of the turning of the target vehicle body longitudinal direction dbt, the drive controller 19 reduces a driving force for the front wheels 2F and also increases a driving force for the rear wheels 2R. Conversely, when the vehicle body longitudinal direction db is directed to the inner side of the turning of the target vehicle body longitudinal direction dbt, the drive controller 19 increases a driving force for the front wheels 2F and also reduces a driving force for the rear wheels 2R. That is, a sign of the braking/driving force correction value CrF is different from a sign of the braking/driving force correction value CrR. Magnitude of the braking/driving force correction value CrF and magnitude of the braking/driving force correction value CrR may be equal to each other or may be different from each other. When the magnitude of the braking/driving force correction value CrF and the magnitude of the braking/driving force correction value CrR are made equal to each other, the braking/driving force correction value calculation unit 34 may calculate a braking/driving force correction value Cr for at least one of the front wheels 2F and the rear wheels 2R, invert a sign of the calculated braking/driving force correction value Cr, and set the braking/driving force correction value Cr the sign of which is inverted as the other braking/driving force correction value (−Cr). By setting the braking/driving force correction value CrF and the braking/driving force correction value CrR to correction values having different signs and the same magnitude, a driving force of the entire vehicle 1 can be prevented from changing due to correction of wheel braking/driving forces for the front wheels 2F and the rear wheels 2R.

In addition, when the vehicle 1 decelerates (that is, when the required braking/driving torque Td is braking torque), the braking/driving force correction value calculation unit 34 may calculate, as with the above-described braking/driving force correction value Cr by which the pre-correction target driving force Fd0 is corrected, a braking/driving force correction value Cr by which a friction braking force generated by the braking device 22 or a regenerative braking force generated by the drive source 23 is corrected. That is, when the vehicle body longitudinal direction db is directed to the outer side of the turning of the target vehicle body longitudinal direction dbt, the braking/driving force correction value calculation unit 34 may calculate a braking/driving force correction value Cr that reduces a braking force for the front wheels 2F or a braking/driving force correction value Cr that increases a braking force for the rear wheels 2R. The braking/driving force correction value calculation unit 34 may calculate a braking/driving force correction value Cr that reduces a braking force for the front wheels 2F and also increases a braking force for the rear wheels 2R.

Conversely, when the vehicle body longitudinal direction db is directed to the inner side of the turning of the target vehicle body longitudinal direction dbt, the braking/driving force correction value calculation unit 34 may calculate a braking/driving force correction value Cr that increases a braking force for the front wheels 2F or a braking/driving force correction value Cr that reduces a braking force for the rear wheels 2R. The braking/driving force correction value calculation unit 34 may calculate a braking/driving force correction value Cr that increases a braking force for the front wheels 2F and also reduces a braking force for the rear wheels 2R.

The drive controller 19 calculates a target regenerative braking force according to an operation amount of the accelerator pedal or a brake pedal operated by the driver and controls the drive source 23 in such a way that a regenerative braking force obtained by correcting the calculated target regenerative braking force with the braking/driving force correction value Cr is generated.

Alternatively, the controller 18 calculates a target friction braking force according to an operation amount of the accelerator pedal or a brake pedal operated by the driver and controls the brake control actuator in the actuators 20 in such a way that a friction braking force obtained by correcting the calculated target friction braking force with the braking/driving force correction value Cr is generated.

(Operation)

FIG. 7 is a flowchart of an example of a travel assistance method of the embodiment.

In step S1, the steering angle sensor 12 detects a steering angle $\theta s(s)$ of the steering wheel. The controller 18 detects vehicle speed V of the vehicle 1. The drive controller 19 calculates a pre-correction target driving force Fd0.

In step S2, the controller 18 estimates a target slip angle $\beta t(s)$, based on at least the vehicle speed V and the steering angle $\theta s(s)$.

In step S3, the controller 18 estimates an actual slip angle $\beta a(s)$, based on at least the vehicle speed V and the steering angle $\theta s(s)$.

In step S4, the controller 18 calculates a slip angle difference $\Delta\beta = \beta t(s) - \beta a(s)$.

In step S5, the controller 18 calculates a braking/driving force correction value Cr, based on the slip angle difference $\Delta\beta$.

In step S6, the drive controller 19 calculates a target driving force Fd to be generated on wheels by correcting the pre-correction target driving force Fd0 with the braking/driving force correction value Cr and causes the drive source 23 to generate the target driving force Fd. Subsequently, the process terminates.

(Variations)

Variations of the embodiment will be described below. Note that in the following variations, the sign of the vehicle body slip angle $\beta$ rotating in a turning direction of the vehicle 1 is defined as positive, and the sign of the vehicle body slip angle $\beta$ rotating in an opposite direction to the turning direction is defined as negative. In addition, the sign of the required braking/driving torque Td that is driving torque is defined as positive, and the sign of the required braking/driving torque Td that is braking torque is defined as negative.

(1) When as the braking/driving force correction value Cr, a correction value increasing a braking/driving force for the front wheels 2F and also a correction value reducing a braking/driving force for the rear wheels 2R are calculated or a correction value reducing a braking/driving force for the front wheels 2F and also a correction value increasing a braking/driving force for the rear wheels 2R are calculated, the target slip angle calculation unit 33 may set a smaller target slip angle $\beta t(s)$ when the required braking/driving torque Td is large than when the required braking/driving torque Td is small. For example, the target slip angle calculation unit 33 may set the target slip angle $\beta t(s)$ in such a manner that the larger the required braking/driving torque Td is, the smaller the target slip angle $\beta t(s)$ is. For example, the target slip angle calculation unit 33 may set a smaller target slip angle $\beta t(s)$ when the required braking/driving torque Td is driving torque than when the required braking/driving torque Td is braking force. Because of this configuration, it is possible to prevent occurrence of understeer at the time of driving and occurrence of oversteer at the time of braking.

(2) The target slip angle calculation unit 33 may set a smaller value of the target slip angle when lateral acceleration is large than when lateral acceleration is small. For example, the target slip angle calculation unit 33 may set the target slip angle $\beta t(s)$ in such a manner that the larger the lateral acceleration is, the smaller the target slip angle $\beta t(s)$ is. Because of this configuration, it is possible to prevent occurrence of understeer when the lateral acceleration is large.

(3) When a driving mode of the vehicle 1 is set by an operation of the switch 13 by the driver (that is, when a response characteristic of the vehicle 1 responding to a driving operation performed by the driver is set), the target slip angle calculation unit 33 may set a larger target slip angle $\beta t(s)$ when the response characteristic is high than when the response characteristic is low. For example, the target slip angle calculation unit 33 may set a larger target slip angle $\beta t(s)$ when the driving mode of the vehicle 1 is the first mode than when the driving mode is the second mode. Because of this configuration, it is possible to set the vehicle body slip angle $\beta$ of the vehicle 1 according to preference of the passenger.

(4) The controller 18 may set a target yaw rate, based on the steering angle $\theta s(s)$ and the vehicle speed V, detect an actual yaw rate that is an actual yaw rate generated in the vehicle 1, and set a target braking/driving force by correcting the required braking/driving force in such a manner as to, when the actual yaw rate is smaller than the target yaw rate, increase a braking/driving force for the rear wheels 2R or reduce a braking/driving force generated on the front wheels 2F. Because of this configuration, the vehicle body slip angle $\beta$ can be controlled in such a way that when the actual yaw rate is smaller than the target yaw rate (that is, when understeer occurs), the vehicle 1 is brought into the inwardly-directed state, and driving feeling is improved.

(5) The braking/driving force correction value calculation unit 34 may calculate a braking/driving force correction value Cr, based on, in addition to the slip angle difference $\Delta\beta$, a slip angular velocity difference $\Delta\beta'$ obtained by subtracting an actual slip angular velocity that is a differential value of the actual slip angle $\beta a(s)$ from a target slip angular velocity that is a differential value of the target slip angle $\beta t(s)$. Because of this configuration, it is possible to improve responsiveness of the braking/driving force correction value Cr with respect to change in the target slip angle $\beta t(s)$ and the actual slip angle $\beta a(s)$.

FIG. 8 is a block diagram of the variation of the functional configuration of the braking/driving force correction value calculation unit 34. The braking/driving force correction value calculation unit 34 includes, in addition to the functional configuration described with reference to FIG. 6, differentiators 50 and 51, a subtracter 52, a gain multiplication unit 53, multipliers 54 and 55, and an adder 56.

The differentiators 50 and 51 and the subtracter 52 calculate a slip angular velocity difference $\Delta\beta'$. The gain multiplication unit 53 outputs a product $D \times \Delta\beta'$ obtained by multiplying the slip angular velocity difference $\Delta\beta'$ by a differential gain D to the multiplier 54. The multiplier 54 normalizes a sign of the slip angular velocity difference $\Delta\beta'$ by multiplying the slip angular velocity difference $\Delta\beta'$ by the output from the sign calculation unit 43. The multiplier 55 multiplies the pre-correction target driving force Fd0 by the output from the multiplier 54 (that is, the slip angular velocity difference $\Delta\beta'$ the sign of which is normalized), and the adder 56 calculates a braking/driving force correction value Cr by summing multiplication results of the multipliers 46 and 55.

Because of this configuration, the braking/driving force correction value calculation unit 34 of the variation calculates a braking/driving force correction value Cr that increases a driving force for the rear wheels 2R when the actual slip angular velocity is larger than the target slip angular velocity and reduces a driving force for the rear wheels 2R when the actual slip angular velocity is smaller than the target slip angular velocity.

As with the above-described embodiment, by normalizing the sign of the slip angular velocity difference $\Delta\beta'$ in a reverse manner to the sign in FIG. 8, the braking/driving force correction value calculation unit 34 can calculate a braking/driving force correction value Cr for correcting a driving force for the front wheels 2F. In addition, the braking/driving force correction value calculation unit 34 may calculate, as with the braking/driving force correction values Cr for correcting a driving force, a braking/driving force correction value Cr for correcting a braking force.

Advantageous Effects of Embodiment (1) The controller 18 detects vehicle speed of the vehicle 1. The steering angle sensor 12 detects a steering angle of the steering wheel. The controller 18 sets a required braking/driving force according to an operation amount of the accelerator pedal or the brake pedal operated by the driver, sets a target value of a vehicle body slip angle $\beta$, the vehicle body slip angle $\beta$ being an angle from the longitudinal direction db of the vehicle body to the travel direction dd of the vehicle 1, as a target slip angle $\beta t(s)$, based on the vehicle speed and the steering angle, estimates or detects an actual slip angle $\beta a(s)$, the actual slip angle $\beta a(s)$ being an actual vehicle body slip angle, and sets a target braking/driving force by, when a sign of a vehicle body slip angle rotating in a turning direction of the vehicle 1 is defined as positive and a sign of a vehicle body slip angle rotating in an opposite direction to the turning direction is defined as negative, correcting the required braking/driving force in such a manner as to increase a braking/driving force for the rear wheels or reduce a braking/driving force generated on the front wheels when the actual slip angle $\beta a(s)$ is larger than the target slip angle $\beta t(s)$ and correcting the required braking/driving force in such a manner as to reduce a braking/driving force for the rear wheels or increase a braking/driving force generated on the front wheels when the actual slip angle $\beta a(s)$ is smaller than the target slip angle $\beta t(s)$. The drive source 23 or the actuator 20 and the turning device 21 generate the target braking/driving force in the vehicle.

Since because of this configuration, the vehicle body slip angle $\beta$ of the vehicle 1 can be appropriately controlled, the vehicle body slip angle can be prevented from becoming excessive or insufficient. As a result, steering operation to cause a vehicle to turn along a desired travel line is facilitated.

(2) The controller 18 may set a target braking/driving force by correcting the required braking/driving force in such a manner as to increase a braking/driving force for the rear wheels and reduce a braking/driving force generated on the front wheels when the actual slip angle $\beta a(s)$ is smaller than the target slip angle $\beta t(s)$ and correcting the required braking/driving force in such a manner as to reduce a braking/driving force for the rear wheels and increase a braking/driving force generated on the front wheels when the actual slip angle βa(s) is larger than the target slip angle βt(s). Because of this configuration, it is possible to prevent a braking/driving force of the entire vehicle 1 from changing due to correction of wheel braking/driving forces for the front wheels 2F and the rear wheels 2R.

(3) The controller 18 may set a larger target slip angle βt(s) when the vehicle speed is high than when the vehicle speed is low. Because of this configuration, when the vehicle speed V is comparatively low, the vehicle 1 can be prevented from being brought into the outwardly-directed state, and when the vehicle speed V is comparatively high, the vehicle 1 can be prevented from being brought into the inwardly-directed state.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1 Vehicle
2F Front wheel
2R Rear wheel
10 Travel assistance device
11 Wheel speed sensor
12 Steering angle sensor
13 Switch
14 Yaw rate sensor
15 Acceleration sensor
16 Brake sensor
17 Accelerator opening sensor
18 Controller
18a Processor
18b Storage device
19 Drive controller
20 Actuator
21 Turning device
22 Braking device
23 Drive source
30 Vehicle speed calculation unit
31 Required torque calculation unit
32 Actual slip angle estimation unit
33 Target slip angle calculation unit
34 Braking/driving force correction value calculation unit
40, 52 Subtracter
41, 53 Gain multiplication unit
42 Sign inversion unit
43 Sign calculate unit
44, 46, 54, 55 Multiplier
45 Limiter
50, 51 Differentiator
56 Adder

The invention claimed is:

1. A travel assistance method comprising:
detecting vehicle speed of a vehicle;
detecting a steering angle of a steering wheel;
setting a required braking/driving force according to an operation amount of an accelerator pedal or a brake pedal operated by a driver;
setting a target value of a vehicle body slip angle, the vehicle body slip angle being an angle from a longitudinal direction of a vehicle body to a travel direction of the vehicle, as a target slip angle, based on the vehicle speed and the steering angle;
estimating or detecting an actual slip angle based on at least the vehicle speed and the steering angle, the actual slip angle being an actual vehicle body slip angle;
setting a target braking/driving force by, when a sign of the vehicle body slip angle rotating in a turning direction of the vehicle is defined as positive and a sign of the vehicle body slip angle rotating in an opposite direction to the turning direction is defined as negative, correcting the required braking/driving force in such a manner as to increase a braking/driving force for both of a rear right wheel and a rear left wheel or reduce a braking/driving force generated on both of a front right wheel and a front left wheel when the actual slip angle is larger than the target slip angle and correcting the required braking/driving force in such a manner as to reduce a braking/driving force for both of the rear right wheel and the rear left wheel or increase a braking/driving force generated on both of the front right wheel and the front left wheel when the actual slip angle is smaller than the target slip angle;
generating the target braking/driving force in the vehicle; and
controlling the vehicle based on the generated target braking/driving force in the vehicle.

2. The travel assistance method according to claim 1, wherein the travel assistance method sets the target braking/driving force by correcting the required braking/driving force in such a manner as to increase a braking/driving force for both of the rear right wheel and the rear left wheel and reduce a braking/driving force generated on both of the front right wheel and the front left wheel when the actual slip angle is larger than the target slip angle and correcting the required braking/driving force in such a manner as to reduce a braking/driving force for both of the rear right wheel and the rear left wheel and increase a braking/driving force generated on both of the front right wheel and the front left wheel when the actual slip angle is smaller than the target slip angle.

3. The travel assistance method according to claim 2, wherein when a sign of the required braking/driving force, the required braking/driving force being a driving force, is defined as positive and a sign of the required braking/driving force, the required braking/driving force being a braking force, is defined as negative, the travel assistance method sets a smaller value of the target slip angle when the required braking/driving force is large than when the required braking/driving force is small.

4. The travel assistance method according to claim 3, wherein the travel assistance method sets a smaller value of the target slip angle when the required braking/driving force is a driving force than when the required braking/driving force is a braking force.

5. The travel assistance method according to claim 1, wherein the travel assistance method sets a larger value of the target slip angle when the vehicle speed is high than when the vehicle speed is low.

6. The travel assistance method according to claim 1, further comprising:

detecting lateral acceleration of the vehicle; and setting a smaller value of the target slip angle when the lateral acceleration is large than when the lateral acceleration is small.

7. The travel assistance method according to claim 1, further comprising:

changing a response characteristic of the vehicle responding to driving operation performed by the driver, based on a selection input from the driver; and setting a larger value of the target slip angle when the response characteristic is high than when the response characteristic is low.

8. The travel assistance method according to claim 1, further comprising:

calculating a target slip angular velocity, the target slip angular velocity being a differential value of the target slip angle, and an actual slip angular velocity, the actual slip angular velocity being a differential value of the actual slip angle; and correcting the required braking/driving force in such a manner as to increase a braking/driving force for a rear wheel or reduce a braking/driving force generated on a front wheel when the actual slip angular velocity is larger than the target slip angular velocity and correcting the required braking/driving force in such a manner as to reduce a braking/driving force for the rear wheel or increase a braking/driving force generated on the front wheel when the actual slip angular velocity is smaller than the target slip angular velocity.

9. The travel assistance method according to claim 1, further comprising:

setting a target yaw rate, based on the steering angle and the vehicle speed;

detecting an actual yaw rate, the actual yaw rate being an actual yaw rate generated in the vehicle; and setting a target braking/driving force by correcting the required braking/driving force in such a manner as to increase a braking/driving force for both of the rear right wheel and the rear left wheel or reduce a braking/driving force generated on both of the front right wheel and the front left wheel when the actual yaw rate is smaller than the target yaw rate.

10. A travel assistance device comprising:

a vehicle speed sensor configured to detect vehicle speed of a vehicle;

a steering angle sensor configured to detect a steering angle of a steering wheel;

a controller configured to set a required braking/driving force according to an operation amount of an accelerator pedal or a brake pedal operated by a driver, set a target value of a vehicle body slip angle, the vehicle body slip angle being an angle from a longitudinal direction of a vehicle body to a travel direction of the vehicle, as a target slip angle, based on the vehicle speed and the steering angle, estimate or detect an actual slip angle based on at least the vehicle speed and the steering angle, the actual slip angle being an actual vehicle body slip angle, and set a target braking/driving force by, when a sign of the vehicle body slip angle rotating in a turning direction of the vehicle is defined as positive and a sign of the vehicle body slip angle rotating in an opposite direction to the turning direction is defined as negative, correcting the required braking/driving force in such a manner as to increase a braking/driving force for both of a rear right wheel and a rear left wheel or reduce a braking/driving force generated on both of a front right wheel and a front left wheel when the actual slip angle is larger than the target slip angle and correcting the required braking/driving force in such a manner as to reduce a braking/driving force for both of the rear right wheel and the rear left wheel or increase a braking/driving force generated on both of the front right wheel and the front left wheel when the actual slip angle is smaller than the target slip angle; and a driving force source or a braking device configured to generate the target braking/driving force in the vehicle and control the vehicle based on the generated target braking/driving force in the vehicle.

* * * * *